July 2, 1968 R. G. MINER 3,390,539
APPARATUS FOR CONTROLLING REFRIGERATION SYSTEMS
Filed Oct. 31, 1966 3 Sheets-Sheet 1

INVENTOR.
ROBERT G. MINER
BY Carl M. Lewis
ATTORNEY

July 2, 1968  R. G. MINER  3,390,539
APPARATUS FOR CONTROLLING REFRIGERATION SYSTEMS
Filed Oct. 31, 1966  3 Sheets-Sheet 2

INVENTOR.
ROBERT G. MINER
BY Carl M. Lewis
ATTORNEY

INVENTOR.
ROBERT G. MINER
BY Carl M. Lewis
ATTORNEY 3,390,539
APPARATUS FOR CONTROLLING
REFRIGERATION SYSTEMS
Robert G. Miner, La Crosse, Wis., assignor to The Trane
Company, La Crosse, Wis., a corporation of Wisconsin
Filed Oct. 31, 1966, Ser. No. 590,674
19 Claims. (Cl. 62—184)

ABSTRACT OF THE DISCLOSURE

In an air cooled refrigeration system utilizing multiple condenser fans, the speed of only one of the fans is modulated in response to a condition of the refrigerant thereby modulating the total air flowing over the condenser despite cycling of the other fans.

---

This invention relates to refrigeration systems of the vapor compression cycle type utilizing an air cooled condenser to condense compressed refrigerant. More specifically, this invention relates to such systems using multiple fans for passing cooling air over the condenser and the apparatus for controlling such fans in response to a condition of the refrigerant in the refrigeration system.

In such refrigeration systems it is desirable that the throttling means pass an amount of liquid refrigerant which is commensurate with the heat load placed upon the evaporator. To vary the amount of liquid refrigerant passing through the throttling means with respect to the load, the throttling means is usually constructed in the form of a capillary tube or variable orifice expansion valve which may be responsive to evaporator outlet temperature and/or pressure. While these devices have proved satisfactory in most systems, they have not proved to be entirely satisfactory in systems using air to cool the condenser. The reason for their somewhat unsatisfactory operation is that the condensing pressure varies considerably depending upon the load on the condenser and the temperature and amount of cooling air passed over the condenser. Such variation in pressure obviously affects the amount of refrigerant passing through the throttling means without regard to the actual load placed on the evaporator. Thus, for example, if the condenser cooling air is relatively cold, the condenser pressure may be excessively low with the result that insufficient refrigerant is delivered to the evaporator to meet the cooling load placed thereon. On the other hand, should the load on the evaporator be relatively small, and the cooling air temperature relatively high, an excessive amount of refrigerant may pass the throttling means and fail to be vaporized in the evaporator thus causing liquid refrigerant slugging in the compressor which is quite deleterious to the compressing mechanism. Thus it will be seen that improper condensing capacity caused by wide variation in condenser cooling air temperature is undesirable and should be controlled.

It is an object of this invention to provide a means for controlling the condenser capacity throughout a wide range of cooling air temperatures. More specifically, it is an object of this invention to modulate the total air moved by multiple condenser fans throughout a range which exceeds the full capacity of any one of the multiple fans.

It is a further object to modulate the total air moved by multiple condenser fans throughout a range which exceeds the full capacity of any one of the multiple fans by modulating the speed of only one of the multiple fans.

It is an object of this invention to modulate the total air moved by multiple condenser fans throughout a range which exceeds the full capacity of any one of the multiple fans by modulating the speed of only one of the multiple fans in response to a condition of the refrigerant thereby providing a relatively constant condenser pressure despite wide variations in condenser cooling air temperatures.

Other objects and advantages will become apparent as this specification proceeds to describe the invention in detail with reference to the accompanying drawings wherein like element have been identified by like numerals throughout and in which.

Figures 1, 2, 3:
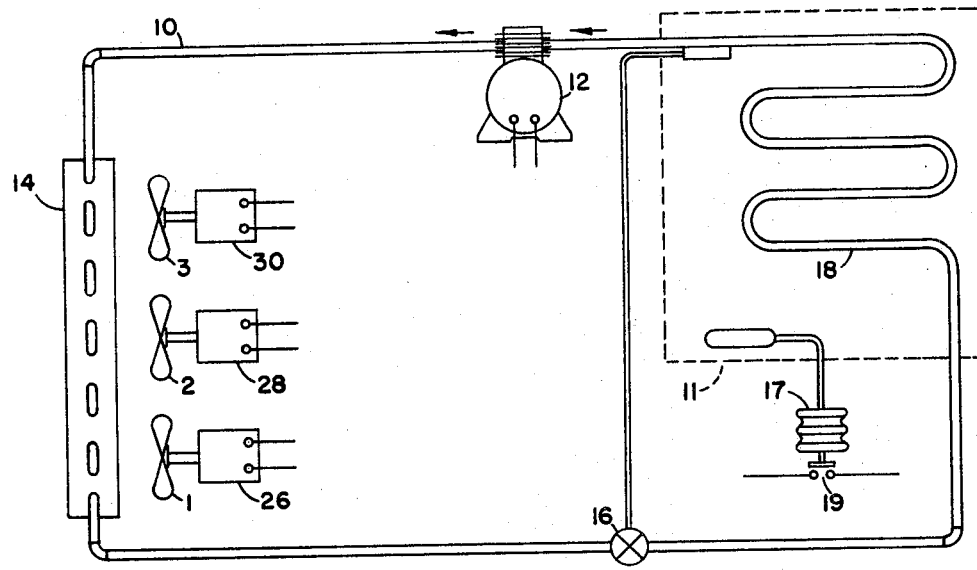
FIGURE 1 is a schematic view of a compression cycle refrigeration system having an air cooled condenser provide with three fans.
FIGURE 2 is a first diagrammatic showing of the operation of the condenser fans of FIGURE 1 in relation to the refrigerant temperature or pressure levels at the condenser.
FIGURE 3 is a second diagrammatic showing of the operation of the condenser fans of FIGURE 1 in relation to the refrigerant temperature or pressure levels at the condenser.

Referring now to FIGURE 1 there is shown a refrigeration system 10 for cooling a conditioned space 11 having an electrically driven refrigerant compressor 12, an air cooled refrigerant condenser 14, refrigerant throttling means such as thermostatic expansion valve 16, and a refrigerant evaporator 18 connected respectively in series in a closed refrigerant circuit or loop in which that portion of the circuit from compressor 12 through condenser 14 to expansion valve 16 comprises the high pressure side of the circuit. A thermostat 17 is arranged to be responsive to the temperature of the conditioned space having an electrical switch 19 which closes upon an increase in temperature above a predetermined set point, the operation of which will be described hereinafter.

Condenser 14 has cooling fans 1, 2, and 3 driven respectively by fan motors 26, 28, and 30. During operation of the system refrigerant gas is drawn from evaporator 18, compressed by compressor 12 and delivered at high pressure to condenser 14 wherein heat is removed by the cooling air causing condensation of the refrigerant gas which condensate passes through expansion valve 16 to a lower pressure zone including evaporator 18 wherein heat received from the surrounding medium vaporizes the refrigerant which is then returned to the compressor. As shown, expansion valve 16 has a sensing bulb connected to sense the temperature of the evaporator outlet or suction line thereby causing the valve to open in response to the load on the evaporator.

Condenser 14 is arranged to be cooled by outside cooling air which varies substantially in temperature. For the purposes set forth as objects of this invention several control schemes shown in FIGURES 4–7 for fan motors 26, 28 and 30 have been provided. Each of these schemes may be constructed to function in the manner illustrated in FIGURES 2 and 3.

Prior to discussing FIGURES 2 and 3 it will be understood that fan motors 26, 28 and 30 are controlled in response to the energy level of the refrigerant in the high pressure side of the refrigerant circuit 10 shown in FIGURE 1 and more particularly controlled in response to the energy level of the refrigerant at the condenser. The terms "energy level of the refrigerant" are intended to connote the pressure and/or temperature of the refrigerant at the condenser measured directly or indirectly. Thus it will be appreciated that the pressure throughout the high pressure side of the refrigerant circuit 10 is about equal to the pressure in the condenser with minor variations due primarily to flow resistance. Pressure measured anywhere in the high side will be a measure of pressure at the condenser. Further, it will be appreciated that throughout that portion of the condenser wherein vapor and liquid refrigerant co-exist under a saturated condition, variations in pressure will be reflected as proportionate variations in temperature. Such temperatures may be indirectly sensed from the temperature of the condenser. Since the control disclosed herein may be responsive to either pressure or temperature as immediately described above, the terms "energy level of the refrigerant" have been used with the intent that such terms include pressure and/or temperature measured directly or indirectly.

Now each of FIGURES 2 and 3 illustrate the operation of the multiple fans for various energy levels at the condenser. Each of FIGURES 2 and 3 illustrate six predetermined energy levels including first, second and third high energy levels arranged respectively in ascending order and first, second and third low energy levels arranged respectively in descending order. Exemplary values for these energy levels for refrigerant 22 are shown in the following table.

Third high energy level _____ 270 p.s.i.a. or 122° F.
Second high energy level _____ 260 p.s.i.a. or 120° F.
First high energy level _____ 250 p.s.i.a. or 116° F.
First low energy level _____ 200 p.s.i.a. or 101° F.
Second low energy level _____ 190 p.s.i.a. or 97° F.
Third low energy level _____ 180 p.s.i.a. or 94° F.

According to the scheme of fan operation illustrated in FIGURE 2, fan #1 operates at full speed (solid portion of fan #1 line) above the first high energy level and from which the fan #1 speed is modulated to zero speed at the first low energy level (dot-dash portion of fan #1 line). Fan #2 operates above the second high energy level (solid portion of fan #2 line), is inoperative below the third low energy level and operates in the range between these levels (dashed portion of fan #2 line) only when the range is entered from a higher energy level. Fan #3 operates above the third high energy level (solid portion of fan #3 line), is inoperative below the second low energy level and operates in the range between these levels (dashed portion of fan #3 line) only when the range is entered from a higher energy level.

According to the scheme of fan operation illustrated in FIGURE 3, fan #1 operates at full speed (solid portion of fan #1 line) above the first high energy level from which the fan #1 speed is modulated to zero speed at the first low energy level (dot-dash portion of fan #1 line). Fan #2 operates above the second high energy level (solid portion of fan #2 line), is inoperative below the second low energy level and operates in the range between these levels (dashed portion of fan #2 line) only when the range is entered from a higher energy level. Fan #3 operates above the third high energy level (solid portion of fan #3 line), is inoperative below the third low energy level and operates in the range between these levels (dashed portion of fan #3 line) only when the range is entered from a higher energy level.

The specific control structure for operating the refrigeration system of FIGURE 1 in accordance with the schemes illustrated in FIGURES 2 and 3 is shown in FIGURES 4–7.

Figure 4:
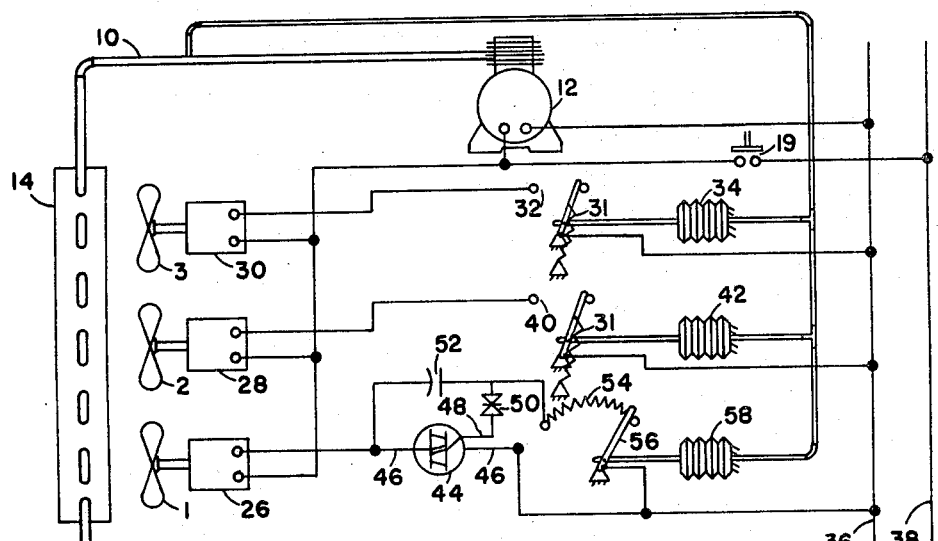
FIGURE 4 is an electrical diagram of a first fan control scheme for the condenser fans shown in FIGURE 1.

The control scheme shown in FIGURE 4 includes a first snap acting switch 32 which is closed by an increase in pressure in bellows actuator 34 for establishing a first electric circuit from line 36 including switch 32, fan motor 30, switch 19 to line 38. It will be understood that lines 36 and 38 are connected to a alternating current power source. Element 32 and 34 are selected so that switch 32 will close at a pressure equivalent to the third high energy level and open at a pressure equivalent to the second low energy level if the system is to be operated according to the scheme of FIGURE 2 or the elements 32 and 34 may be selected so that switch 32 close at a pressure equivalent to the third high energy level and open at a pressure equivalent to the third low energy level if the system is to be operated according to the scheme of FIGURE 3. A second snap acting switch 40 closed by an increase in pressure in bellows actuator 42 is provided for establishing a second electric circuit from line 36, including switch 40, fan motor 28, switch 19 to line 38. Elements 40 and 42 are selected so that switch 40 will close at a pressure equivalent to the second high energy level and open at a pressure equivalent to the third low energy level if the system is to be operated according to the scheme of FIGURE 2 or the elements 40 and 42 may be selected so that switch 40 will close at a pressure equivalent to the second high energy level and open at a pressure equivalent to the second low energy level if the system is to be operated according to the scheme of FIGURE 3. A third switch in the form of a solid state symmetrical gated switch 44 is connected with its main terminals 46 in a circuit from line 36 including terminals 46 of switch 44, motor 26, switch 19 to line 38. Switch 44 controls the current to motor 26 for modulating the speed of fan 1. Switch 44 is caused to conduct only during that part of each half cycle following the flow of trigger current at the gate 48 which is connected via trigger diode 50 to an RC circuit shunting terminals 46 including capacitance 52 and resistance 54 disposed in series. Trigger diode 50 may consist of a pair of Zener diodes arranged in back-to-back relation whereby the trigger diode 50 will conduct trigger current in either direction but only when the voltage across the device exceeds the predetermined breakdown voltage of the Zener diodes. During each half cycle, the current passing through resistance 54 builds up an electric charge in capacitor 52 until the diode breakdown voltage is reached causing trigger diode 50 to conduct which in turn causes switch 44 to conduct for the remainder of the half cycle. It will be appreciated that the size of resistance 54 will thus control the amount of current passing through switch 44. In the embodiment shown in FIGURE 4, resistance 54 is in the form of a potentiometer 56 actuated by bellows 58 to reduced resistance upon increase in pressure. Elements 44, 50, 52, 54 and 58 are selected so that switch 44 begins to conduct current at a pressure equivalent to the first low energy level and conducts full current at a pressure equivalent to the first high energy level for either scheme of operation shown in FIGURES 2 and 3. Each of bellows 34, 42 and 58 is connected in fluid communication with the high side of the refrigerant circuit 10 for sensing high side pressure. The motor of compressor 12 is also disposed in an electric circuit from line 36 including switch 19 and the motor of compressor 12 to line 38. Each of switches 32 and 40 may have an over center type spring 31 for snap action. The operation of the refrigeration system control scheme shown in FIGURES 1 and 4 is as follows.

OPERATION—FIGURE 4

Upon a rise in temperature of conditioned space 11 (FIGURE 1) to a predetermined temperature, thermostat 17 closes switch 19 permitting electric current to flow through the aforementioned circuit containing the motor of compressor 12 causing compressor 12 to compress gas from evaporator 18 and deliver it to the high pressure side of the refrigerant circuit 10 causing the pressure and temperature in the high pressure side to increase.

When the refrigerant in the high pressure side increases to the first low energy level switch 44 begins to conduct causing fan 1 to operate at low speed. If the pressure increases further, switch 44 will increase the current further to increase the speed of fan 1 until full speed is reached at a pressure equal to the first high energy level. If the pressure falls from this level the speed of fan 1 will accordingly be reduced. However, if the full speed of fan 1 is insufficient to maintain the pressure at or below the first high energy level, the pressure may continue to rise to the second high energy level at which level switch 40 is closed and fan 2 is operated.

Should the pressure now fall because of the increased air flow over the condenser, switch 44 begins to reduce the current to motor 26 and the speed of fan 1 when the pressure falls below the first high energy level. The fan 1 speed is modulated to zero as the pressure falls to the first low energy level at which point switch 44 no longer conducts.

During this modulation of the speed of fan 1, fan 2 will continue to operate owing to the differential characteristic of snap acting switch 40 until the pressure is reduced to the third low energy level for the scheme of FIGURE 2 or the second low energy level for the scheme of FIGURE 3 at which point switch 40 will open and shut off fan 2. However, if both fans 1 and 2 are operating and the pressure continues to rise to the third high energy level, switch 32 will close causing motor 30 to operate fan 3. Should the pressure now fall below the first high energy level the speed of fan 1 will be reduced to zero as the pressure falls to the first low energy level as aforedescribed. Should the pressure continue to fall to the second low energy level, switch 32 will open causing fan 3 to shut off in the scheme of FIGURE 2 or switch 40 will open causing fan 2 to shut off in the scheme of FIGURE 3. Thus under these conditions only fan 2 continues to run in the FIGURE 2 scheme or only fan 3 continues to run in the FIGURE 3 scheme. Should the pressure rise above the first low energy level from this point, switch 44 will begin to conduct causing fan 1 to start and increase its speed. However should the pressure fall below the third low energy level, switch 40 in the scheme of FIGURE 2 will cause fan 2 to shut off while switch 32 in the scheme of FIGURE 3 will cause fan 3 to shut off. It will be appreciated that same number of fans will be operated for the two schemes of FIGURES 2 and 3 for any given energy level although the specific fan which is operated may be different for the two schemes.

It is important to appreciate that the energy level of the high side refrigerant and the amount of condenser cooling will only be in substantial equilibrium when the energy level is maintained between the first high and first low levels where the speed of fan one is modulated. Beyond the ends of this range, condenser fans are either turned on or off and the speed of no fan is modulated. Because of the lack of fan speed modulation beyond this range, the energy level is unstable and the departures from the range between the first high and the first low energy levels are only momentary. Accordingly it will be seen that the system thus operated will maintain the refrigerant high side pressure normally within the pressure limits within which only the speed of one fan is modulated and yet the amount of cooling air delivered to the condenser is modulated substantially from no air flow to the total air flow of all three fans. This substantially complete modulation of air flow from no flow to full flow of all three fans is obtained inexpensively by applying a variable speed fan controller to only one of the fans.

FIGURE 5

Figure 5:
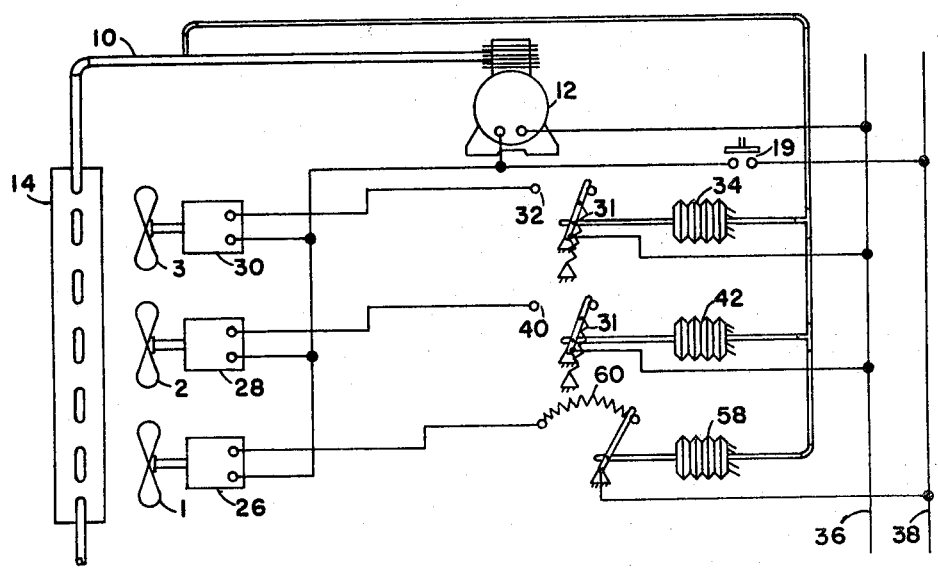
FIGURE 5 is an electrical diagram of a second fan control scheme for the condenser fans shown in FIGURE 1.

The control arrangement shown in FIGURE 5 is the same as that shown in FIGURE 4 with the exception of the control for fan motor 26. In this arrangement, bellows actuator 58 operates directly the power varying means for motor 26, which may be in the form of a variable transformer or as shown a power reostat 60 connected in series with motor 26. Thus it will be seen that an electric circuit is established from line 36 including reostat 60, motor 26 and switch 19 to line 38. Reostat 60 is arranged to reduce resistance when bellows 58 senses an increase in pressure whereby a larger amount of current is passed through motor 26 with higher high side pressures resulting in a higher speed for fan 1. With the above described exception of power reostat 60, the operation of the FIGURE 5 control arrangement is the same as that of FIGURE 4.

FIGURE 6

Figure 6:
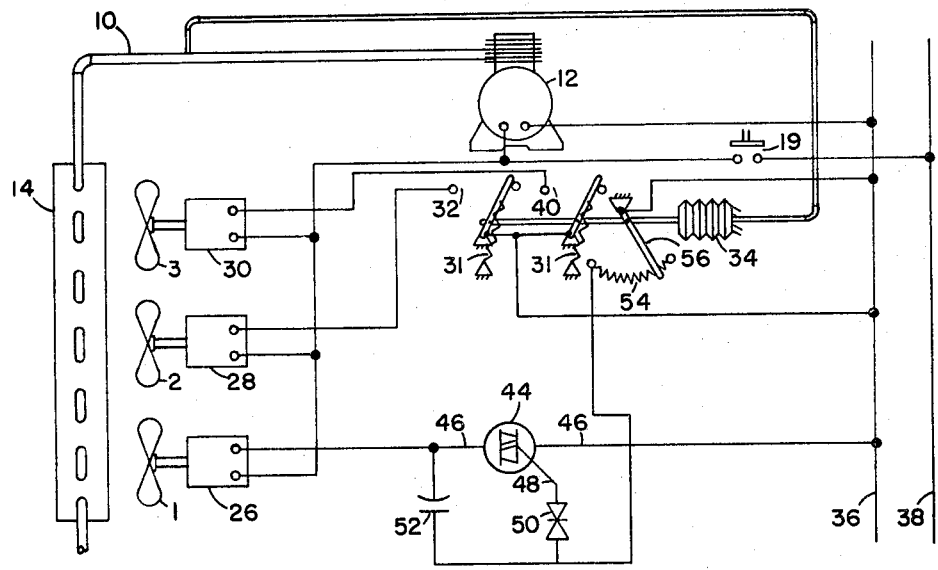
FIGURE 6 is an electrical diagram of a third fan control scheme for the condenser fans shown in FIGURE 1.

The control arrangement of FIGURE 6 operates in identical manner to the arrangement of FIGURE 4 and differs structurally only in that switches 32 and 40 and potentiometer 56 are all actuated from single bellows actuator 34.

FIGURE 7

Figure 7:
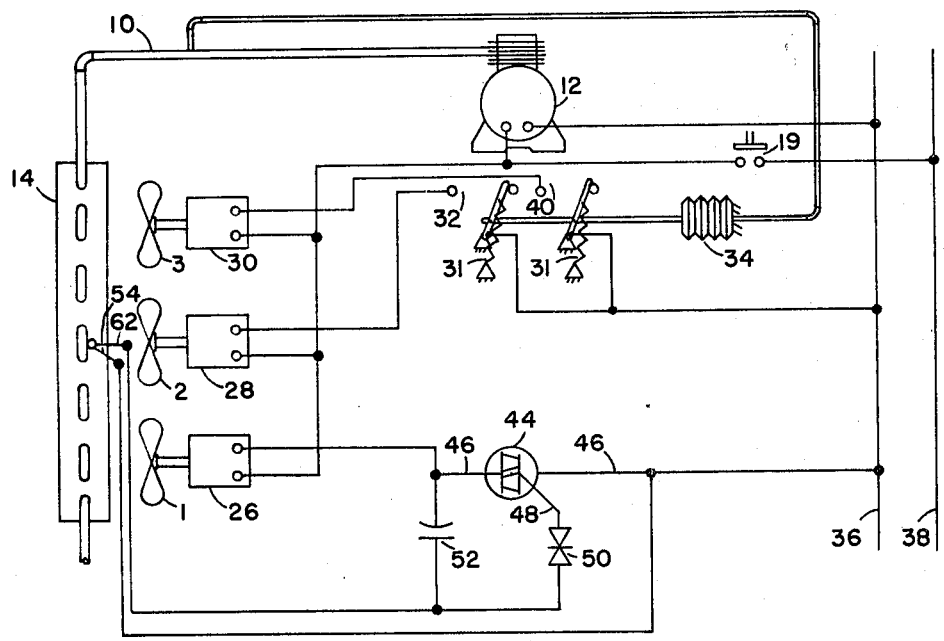
FIGURE 7 is an electrical diagram of a fourth fan control scheme for the condenser fans shown in FIGURE 1.

In the control arrangement shown in FIGURE 7 each of switches 32 and 40 is actuated by single bellows actuator 34 in the same manner as switches 32 and 40 of FIGURE 6. Fan motor 26 is controlled by a switch 44 as shown in FIGURE 4. However, in this form of the invention the resistance 54, for operating symmetrical gated switch 44, is a thermistor 62 connected to condenser 14 in heat exchange relation therewith for sensing the energy level of the refrigerant. It will be appreciated that except for the inlet end and the oulet end where superheated and subcooled conditions respectively may exist, the refrigerant in the condenser is in a saturated condition where temperature may be equated to pressure and vice versa. Accordingly, it is preferred that hermistor 62 be connected for sensing the saturation temperature of the condenser. Thermistor 62 has a negative coefficient of resistance whereby increased temperature operates to reduce the resistance. Thus, as the pressure and temperature in condenser 14 increase, the resistance of thermistor 62 is reduced causing switch 44 to conduct a larger current for operating motor 26 at a higher speed. It is thus seen that switch 44 may be operated in the same manner as switch 44 of FIGURE 4.

It will be appreciated that each of the control arrangements of FIGURES 4, 5, 6 and 7 may be operated in accordance with either of the control schemes of FIGURES 2 and 3 selecting switches 34 and 40 with relative limits as required for the control scheme shown in FIGURES 2 and 3.

Although I have described in detail several preferred embodiments of my invention, I contemplate that many changes may be made without departing from the scope or spirit of my invention, and I desired to be limited only by the claims.

I claim:

1. In a refrigeration system having a refrigerant compressor, a refrigerant condensing means, a refrigerant throttling means and a refrigerant evaporator respectively serially connected in a closed refrigerant containing circuit; that portion of said refrigerant circuit extending from said compressor through said condensing means to said throttling means being the high pressure side thereof, the improvement comprising: first, second and third fans arranged to cool said condensing means; means for controlling the operation of said first, second and third fans in response to variations in the energy level of said refrigerant in said high pressure side throughout a range of energy levels including first, second and third predetermined high energy levels spaced respectively in ascending order and first, second and third predetermined low energy levels spaced respectively in descending order and spaced below said predetermined high energy levels, including means for modulating the speed of said first fan from substantially less than full speed to a ssubstantially higher speed in response to variations respectively in the energy level of said refrigerant from said first predetermined low to said first predetermined high energy level; means for cycling said second fan on in response to a rise in the energy level of said refrigerant above said second predetermined high energy level and off in response to a fall in the energy level of said refrigerant below one of said second and third predetermined low energy levels; and means for cycling said third fan on in response to a rise in the energy level of said refrigeration above said third predetermined high energy level and off in response to a fall in the energy level of said refrigerant below the other of said second and third predetermined low energy levels.

2. The apparatus as defined by claim 1 wherein said one predetermined low energy level is said third predetermined low energy level and said other predetermined low energy level is said second predetermined low energy level.

3. The apparatus as defined by claim 1 wherein said one predetermined low energy level is said second predetermined low energy level and said other predetermined low energy level is said third predetermined low energy level.

4. In a refrigeration system having a refrigerant compressor, a refrigerant condensing means, a refrigerant throttling means and a refrigerant evaporator respectively serially connected in a closed refrigerant containing circuit; that portion of said refrigerant circuit extending from said compressor through said condensing means to said throttling means being the high pressure side thereof, the improvement comprising: first, second and third fans arranged to cool said condensing means; first, second and third electric motors respectively drivingly connected to said first, second and third fans; first, second and third electrical circuits for respectively supplying electrical current to said first, second and third motors in response to variations in the energy level of the refrigerant in said high pressure side throughout a range of energy levels including first, second and third predetermined high energy levels spaced respectively in ascending order and first, second and third predetermined low energy levels spaced respectively in descending order and spaced below said predetermined high energy levels; current modulating means for modulating the current in said first circuit from substantially less than full current to a substantially higher current in response to variations in the energy level of said refrigerant from said first predetermined low to said first predetermined high energy level; first switch means in said second circuit arranged to conduct current in response to a rise in the energy level of said refrigerant above said second predetermined high energy level and to substantially discontinue conducting current in response to a fall in the energy level of said refrigerant below one of said second and third predetermined low energy levels; and a second switch means in said third circut arranged to conduct current in response to a rise in the energy level of said refrigerant above said third predetermined high energy level and to substantially discontinue conducting current in response to a fall in the energy level of said refrigerant below the other of said second and third predetermined low energy levels.

5. The apparatus as defined by claim 4 wherein said first and second switch means are actuated by a common energy level sensing means responsive to the energy level of said refrigerant in said high pressure side of said refrigerant circuit.

6. The apparatus as defined by claim 4 wherein said modulating means, said first switch means and said second switch means are actuated by a common energy level sensing means responsive to the energy level of said refrigerant in said high pressure side of said refrigerant circuit.

7. The apparatus as defined by claim 4 wherein said one predetermined low energy level is said third predetermined low energy level and said other predetermined low energy level is said second predetermined low energy level.

8. The apparatus as defined by claim 4 wherein said one predetermined low energy level is said second predetermined low energy level and said other predetermined low energy level is said third predetermined low energy level.

9. In a refrigeration system having a refrigerant compressor, a refrigerant condensing means, a refrigerant throttling means and a refrigerant evaporator respectively serially connected in a closed refrigerant containing circuit; that portion of said refrigerant circuit extending from said compressor through said condensing means to said throttling means being the high pressure side thereof, the improvement comprising: a plurality of fans arranged to cool said condensing means; a plurality of electric motors respectively drivingly connected to said plurality of fans; a plurality of electrical circuits for respectively supplying electrical current to said plurality of motors in response to variations in the energy level of the refrigerant in said high pressure side throughout a range of energy levels including first and second predetermined high energy levels spaced respectively in ascending order and first and second predetermined low energy levels spaced respectively in descending order and spaced below said predetermined high energy levels; current modulating means for modulating the current through one of said motors from substantially less than full current to a substantially higher current in response to variations in the energy level of said refrigerant from said first predetermined low to said first predetermined high energy level; and switch means in series with another of said motors arranged to conduct current in response to a rise in the energy level of said refrigerant above said second predetermined high energy level and to substantially discontinue conducting current in response to a fall in the energy level of said refrigerant below said second predetermined low energy level.

10. The apparatus as defined by claim 9 wherein said current modulating means and said switch means are actuated by a common energy level sensing means responsive to the energy level of said refrigerant in said high pressure side of said refrigerant circuit.

11. A refrigeration system comprising: a refrigerant compressor; an air cooled refrigerant condenser; a refrigerant throttling means; and a refrigerant evaporator respectively serially connected in a closed refrigerant circuit; that portion of said circuit between said compressor and said throttling means including said condenser being the high pressure side thereof; means disposing said evaporator in heat exchange relation with a conditioned space; a first fan means arranged for passing atmospheric cooling air through said condenser, a second fan means arranged for passing atmospheric cooling air through said condenser; means for activating and deactivating said second fan means in response to a load condition of said condenser while said first fan means is operating; means for controllably limiting the air flow passing said first fan means during operation of said first fan means without substantially limiting air flow passing said second fan means in response to a load condition of said condenser whereby said limiting means associated with said first fan means serves to modulate the total air flow through said condenser despite sharp fluctuations in air flow resulting from activation and deactivation of said second fan means.

12. The apparatus as defined by claim 11 wherein said limiting means is responsive to a condition of the refrigerant at said high pressure side.

13. The apparatus as defined by claim 12 wherein said means for activating and deactivating said second fan means is responsive to a condition of the defrigerant at said high pressure side.

14. The apparatus as defined by claim 13 wherein said means for activating and deactivating said second fan means is responsive to the pressure of the refrigerant at said high pressure side.

15. The apparatus as defined by claim 12 wherein said means for controllably limiting the air flow passing said first fan means is responsive to the refrigerant pressure in the high pressure side of said refrigerant circuit.

16. The apparatus as defined by claim 15 wherein said means for activating and deactivating said second fan means is responsive to a condition of the refrigerant at said high pressure side.

17. The apparatus as defined by claim 16 wherein said means for activating and deactivating said second fan means is responsive to the pressure of the refrigerant at said high pressure side.

18. The apparatus as defined by claim 11 wherein said means for activating and deactivating said second fan means is responsive to a condition of the refrigerant.

19. The apparatus as defined by claim 18 wherein said means for activating and deactivating said second fan means is responsive to refrigerant pressure in the high pressure side of said circuit.

References Cited
UNITED STATES PATENTS

| | | | |
|---|---|---|---|
| 3,112,620 | 12/1963 | Stewart | 62—183 |
| 3,138,941 | 6/1964 | Jensen | 62—184 |
| 3,152,455 | 10/1964 | Ware | 62—184 |
| 3,191,399 | 6/1965 | Stewart | 62—180 |
| 3,289,429 | 12/1966 | Beard | 62—183 |

WILLIAM J. WYE, *Primary Examiner.*